United States Patent [19]

Moulding, Jr. et al.

[11] Patent Number: 5,042,685
[45] Date of Patent: Aug. 27, 1991

[54] DISPENSING HAVING A COMPARTMENT FOR DETECTING AND COUNTING THE DISPENSED OBJECTS ESPECIALLY ADAPTED FOR DISPENSING MEDICATION AND METHOD OF USING THE SAME

[76] Inventors: Thomas S. Moulding, Jr., 214 Via La Soledad, Redondo Beach, Calif. 90277; Donald G. Ellis, Geneva Park, Boulder, Colo. 80302

[21] Appl. No.: 392,273

[22] Filed: Aug. 10, 1989

[51] Int. Cl.⁵ .............................................. B65G 59/00
[52] U.S. Cl. ........................................... 221/1; 221/3; 221/12; 221/21; 221/152; 221/185; 221/241
[58] Field of Search .................. 221/1, 2, 3, 8, 9, 10, 221/12, 15, 21, 151–153, 185, 241, 263, 266; 368/10, 107–113; 340/309.15, 309.4; 364/569

[56] References Cited

U.S. PATENT DOCUMENTS

| | | |
|---|---|---|
| 3,223,297 | 12/1965 | Nyden . |
| 3,412,254 | 11/1968 | Meyer-Doering et al. . |
| 3,565,194 | 2/1971 | Eagle et al. ............................ 177/50 |
| 3,581,067 | 5/1971 | Willits et al. . |
| 3,652,864 | 3/1972 | Person . |
| 3,681,570 | 8/1972 | Abt ................................ 235/61.7 R |
| 3,698,493 | 10/1972 | Yamanaka et al. .................... 177/3 |
| 3,835,306 | 9/1974 | Bills et al. . |
| 3,853,267 | 12/1974 | Cadwell et al. ................ 235/151.33 |
| 3,900,718 | 8/1975 | Seward ........................... 235/150.51 |
| 3,921,196 | 11/1975 | Patterson . |
| 3,965,340 | 6/1976 | Renner et al. .................. 235/151.32 |
| 4,000,839 | 1/1977 | Tecco et al. ........................... 222/540 |
| 4,066,173 | 1/1978 | Adams et al. ......................... 377/6 X |
| 4,139,892 | 2/1979 | Gudea et al. ......................... 364/567 |
| 4,223,801 | 9/1980 | Carlson ................................... 223/3 |
| 4,275,384 | 6/1981 | Hicks et al. ........................ 340/309.4 |
| 4,310,103 | 1/1982 | Reilly, Jr. et al. ..................... 221/15 |
| 4,316,518 | 2/1982 | Jonath ..................................... 177/25 |
| 4,360,125 | 11/1982 | Martindale et al. .................... 221/2 |
| 4,373,133 | 2/1983 | Clyne et al. ........................... 235/383 |
| 4,375,838 | 3/1983 | Yano et al. ............................. 177/50 |
| 4,379,496 | 4/1983 | Godat et al. ........................... 177/25 |
| 4,476,381 | 10/1984 | Rubin ..................................... 235/375 |
| 4,481,667 | 11/1984 | Price et al. ........................... 377/6 X |
| 4,555,624 | 11/1985 | Steffen . |
| 4,563,739 | 1/1986 | Gerpheide et al. .................. 364/403 |
| 4,573,606 | 3/1986 | Lewis et al. ........................... 221/2 |
| 4,585,151 | 4/1986 | Luker ..................................... 221/153 |
| 4,628,193 | 12/1986 | Blum ..................................... 235/375 |
| 4,656,600 | 4/1987 | Swann ................................... 364/567 |
| 4,695,954 | 9/1987 | Rose et al. ........................... 364/413 |
| 4,725,997 | 2/1988 | Urquhart et al. ..................... 368/10 |
| 4,748,600 | 5/1988 | Urquhart ............................... 368/10 |
| 4,869,392 | 9/1989 | Moulding, Jr. et al. ............... 221/1 |

Primary Examiner—David H. Bollinger
Attorney, Agent, or Firm—Robert E. Purcell

[57] ABSTRACT

A medication dispenser that includes a receptacle having a counting compartment with a first opening into the receptacle and a second opening through which the pills are dispensed. To be dispensed, the pills must pass-through the counting compartment and are counted during such passage. Both openings are blocked or unblocked by logic built into or remotely connected to the dispenser, which logic determines whether the pills in the compartment should be dispensed. In one embodiment of the dispenser, the pills are counted by sensing the amount of light that is passed through the compartment. The logic counts the pills by subtracting the amount of light transmitted through the compartment when it contains pills from the amount of light transmitted through an empty compartment and comparing the result to the known size of the pills. In an alternative embodiment, the pills are weighed in the counted compartment and the weight is compared to the known weight of a single pill. In a second alternative embodiment, radiation emitted by the pills is counted with a radiation detector.

46 Claims, 7 Drawing Sheets

DISPENSING HAVING A COMPARTMENT FOR DETECTING AND COUNTING THE DISPENSED OBJECTS ESPECIALLY ADAPTED FOR DISPENSING MEDICATION AND METHOD OF USING THE SAME

RELATED PATENT APPLICATIONS

This patent application is related to the inventors' copending U.S. patent application Ser. No. 099,039 filed May 16, 1986, entitled "Medication Dispenser and Method of Dispensing Medication" the subject matter of which is incorporated herein by reference for all that is disclosed therein, which patent application is related to U.S. patent application Ser. No. 864,144 filed May 16, 1986 entitled "Medication Dispenser and Method of Dispensing Medication", the subject matter of which is incorporated herein by reference for all that is disclosed therein, which patent application is related to U.S. patent application Ser. No. 547,019, filed Oct. 31, 1983, now abandoned, entitled "Medication Dispenser and Method of Dispensing Medication", the subject matter of which is incorporated herein by reference for all that is disclosed therein.

BACKGROUND OF THE INVENTION

The dispensing of medication, especially in hospitals, nursing homes and the like, presently involves archaic, labor intensive, error prone procedures.

The traditional method of dispensing medication on hospital floors requires the nurses on each shift to deposit the prescribed amount of medication for a particular patient into a cup. At the appropriate time, the nurse takes the medication filled cup to the designated patient and records on a chart the amount and kind of medication given to the patient, the time when the medication is given, and the identity of the patient to whom the medication is given. In many hospitals and nursing homes over thirty percent of nursing time is spent dispensing and recording the dispensing of medication, thereby contributing to the ever increasing cost of medical care and diverting nursing skills from more important functions and duties. Moreover, such traditional method of dispensing medication permits human error in any one of several steps of the method such as selecting the proper medication from several available medications, calculating the proper amount of medication, delivering the medication to the proper person, delivering the medication at the proper time, accurately and completely recording or charting the data concerning the dispensing of the medication, maintaining the physical copy of the record in the patient's chart or in a file, etc.

Sometimes medication is left at the bedside of hospital patients who are not critically ill and who are considered to be of sound mind and reliable for self administration of the medicine. However, these patients often will not take the medication as directed, and thus, no accurate record of medication actually ingested can be made.

Patients living at home are usually left with the responsibility of following directions to take medication. In addition to those circumstances where such patients intentionally fail to follow the instructions, such patients, especially feeble minded or elderly patients, often forget to take the medication, take the wrong amount of medication, take the medication at the wrong time, take one medication according to the instruction for another medication, etc. Many patients are forced into nursing homes and sometimes into hospitals solely to insure that they take medication according to prescribed instructions. Such a forced residence can be cruel to a patient who wants to stay home and is oppressively expensive for those persons or entities who pay for the hospital or nursing home stay.

It is thus apparent that there is a need in the art for an improved method or apparatus which can dispense the proper amount of medication at the proper time. Another need in the art is for such a dispenser that can keep a record of the amount of medication dispensed to a patient, and adjust the amount of medication higher or lower, depending upon the past amount of the medication dispensed and the changing medical needs of the patient.

SUMMARY OF THE INVENTION

It is an object of the present invention to dispense medication including pills or the like.

It is another object of the present invention to count the number of pills dispensed each time dispensing occurs.

Yet another object is to keep a record of the amount of medication dispensed by the present invention along with the times of such dispensing.

Still another object of the present invention is to count such pills using light transmitted through a medication counting compartment located in the dispensing mechanism.

Still another object of the invention is to count such pills by weighing the amount of pills in such counting compartment.

Another object is to ensure that all medication which has been counted is removed from the dispenser after the counting compartment has been opened for removal of the medication.

Another object is to accept, through a communications means, data that defines when such medication is to be dispensed.

Another object is to accept data that defines how much medication is to be dispensed at each time interval.

Another object is to allow the dispenser to be separated from the system that determines when and how much medication to dispense.

Another object of the invention to provide a pill storage receptacle that allows the pills to be loosely arranged therein, with no particular order required.

Still another object of the present invention is to provide an audible reminder of when the medication should be dispensed.

A still further object of the present invention is to provide a visual display to indicate the time and amount of medication to be dispensed.

The above and other objects are accomplished in a medication dispenser that includes a receptacle for the pills being dispensed such receptacle being large enough to allow the pills to be loosely arranged therein. Attached to the receptacle is a counting compartment having an opening into the receptacle, and a second opening through which the pills are dispensed. To be dispensed, the pills must pass through the counting compartment, and are counted by the dispenser during the passage. Both openings are blocked or unblocked by physical action of the patient using the dispenser, however, such blocking and unblocking is regulated by the device through logic built into or remotely connected to the device.

In one embodiment of the device, the counting compartment has a transparent top and bottom, and a light is placed over the top of the compartment. Underneath the compartment is a light sensing device, and the pills are counted by sensing the amount of light that is passed through the compartment. The logic counts the pills by subtracting the amount of light passed through the compartment from the amount of light passed through an empty compartment and comparing the result to the known size of the pills.

In an alternative embodiment, the pills are weighed in the counting compartment and the weight is compared to the known weight of a single pill.

In another alternative embodiment, radiation emitted by the pills is counted with a radiation detector.

After counting the pills, the logic decides whether to allow the counting compartment to open and dispense the pills. This decision is made by comparing the number of pills in the compartment to dosage information sent to the logic thorough a communication interface when the dispenser is initially filled with pills. The logic records the amount and time of each dispensing.

In an alternative mode of operation, the logic could allow the counting compartment to open each time the medication units are counted in the counting compartment without requiring that a predesignated number of medication units are removed. This procedure would permit the dispensing of any number of medication units without restrictions, but still achieve counting of the medication units removed.

Optionally, the dispenser can include an audible indicator which is activated by the logic when the patient should have medication.

The dispenser may also contain a display device which is used to indicate to the patient the amount of medication to be dispensed at the time the medication should be taken.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

The present invention relates to a dispenser for solid units of medication such as pills, tablets, capsules and the like. The medication units are kept in an interior receptacle and removed from the dispenser by first passing them into a separate counting compartment where the number of medication units is counted. The medication units are then dispensed to the patient. A gate mechanism is provided between the receptacle and the counting compartment and between the counting compartment and the exterior of the dispenser. The medication is counted by measuring the amount of light blocked by the medication, and then comparing the light blocked to the known light blocking characteristics of the medication units. Alternatively, the medication units can be weighed, or if the units emit radiation, the amount of radiation can be measured.

Electronic logic circuitry in the dispenser controls the opening of the gates to regulate the number of medication units removed, and the time of such removal. A communications interface allows a pharmacist to enter data regarding the amount and times that medication is to be dispensed. The dispenser also maintains a record of the number of medication units dispensed over time, and can be equipped with a display, such as a liquid crystal display, to inform the patient when and how much medication to take. Also, an audible alarm can be included to provide an audible indication that medication should be taken.

Figure 1:
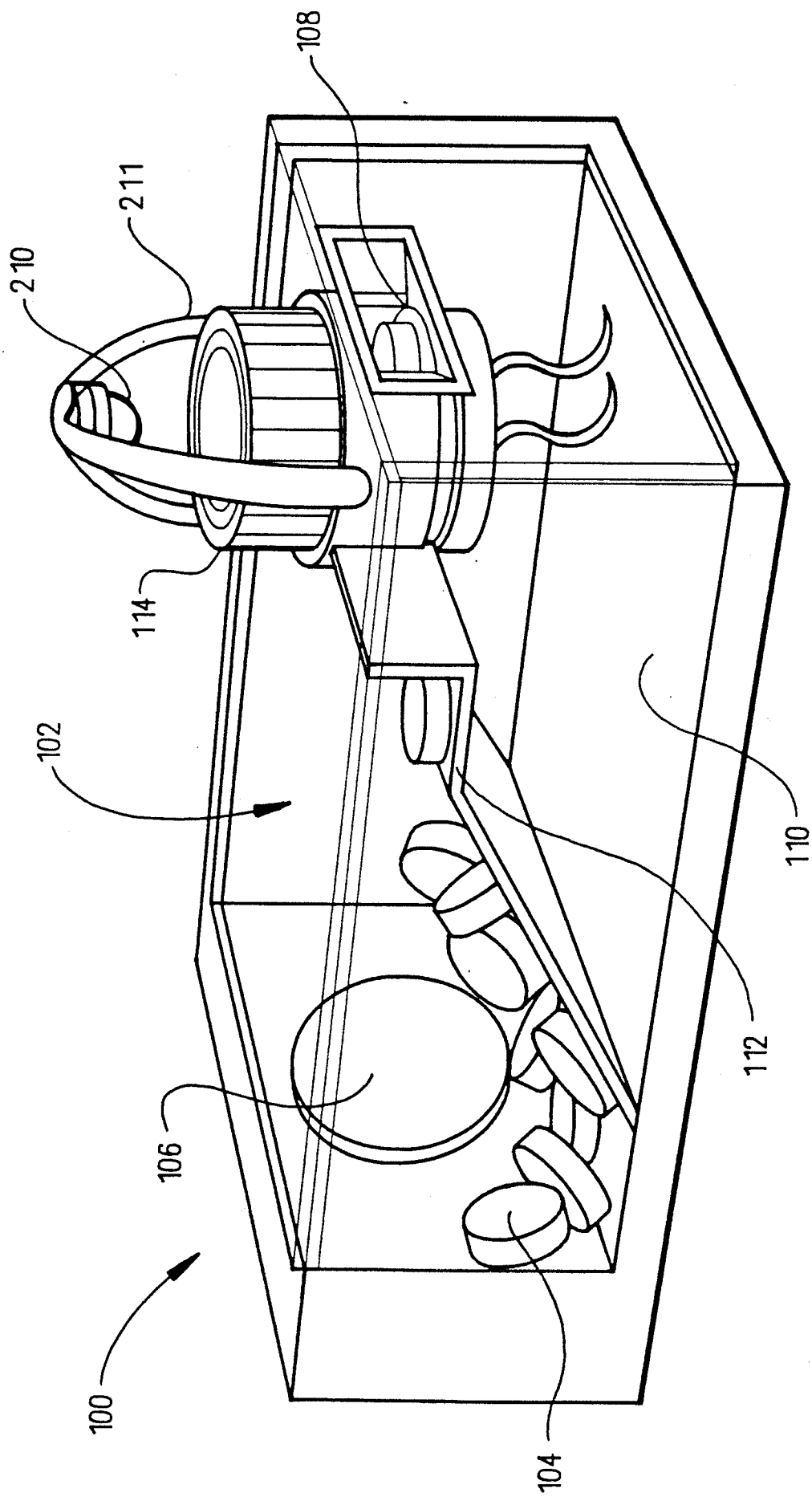
FIG. 1 is a perspective, phantom view of a medication dispenser in accordance with one embodiment of the present invention.

FIG. 1 shows a perspective view of the preferred embodiment of the present invention. Referring now to FIG. 1, a dispenser 100 is shown having a medication unit receptacle 102, which is designed to hold medication units 104. The receptacle 102 is filled through a cover 106 which may be threadably secured to the dispenser 100, or be secured with a locking mechanism to ensure that the medication is not removed except through normal operation. Medication units 104, such as pills, tablets, capsules or the like, are loosely stored in the receptacle 102 in a non-ordered state and are dispensed through a counting compartment 108 to the patient. The counting compartment 108 has a gate mechanism (not shown in FIG. 1) which controls the blocking and unblocking of the opening between receptacle 102 and the counting compartment 108 and the blocking and unblocking of the opening between the counting compartment 108 and the exterior of the dispenser. This gate is controlled by electronic logic which could be located in the dispenser, for example in the cavity 110, or located remotely, from, but connected to, the dispenser. Remote electronic logic could be capable of controlling multiple dispensers, allowing the dispensing of multiple types of medication units to a patient, or dispensing to several patients.

Medication units 104 are moved to a shelf 112 in the receptacle 102, and then the desired number of medication units 104 are moved from the shelf 112 into the counting compartment 108 by the patient shaking, tilting, and otherwise maneuvering the dispenser. The gate between the receptacle 102 and the counting compartment 108 is then closed by the patient rotating a knob 114, the medication units 104 are counted, and if a desireable number of medication units 104 are in the counting compartment, the gate between the counting compartment 108 and the exterior of the dispenser can be opened by continued rotation of the knob 114 to dispense the medication units 104. If the amount of medication is undesirable, a blocking mechanism controlled by a solenoid (not shown in FIG. 1) inside the gate prevents the knob 114 from rotating to dispense the medication, however, the blocking mechanism and the solenoid allow the knob 114 to be rotated back to allow medication units 104 to be transferred between the receptacle 102 and the counting compartment 108. Thus, the gate 114 permits only the proper amount of medication to be dispensed at any given time.

Figure 2:
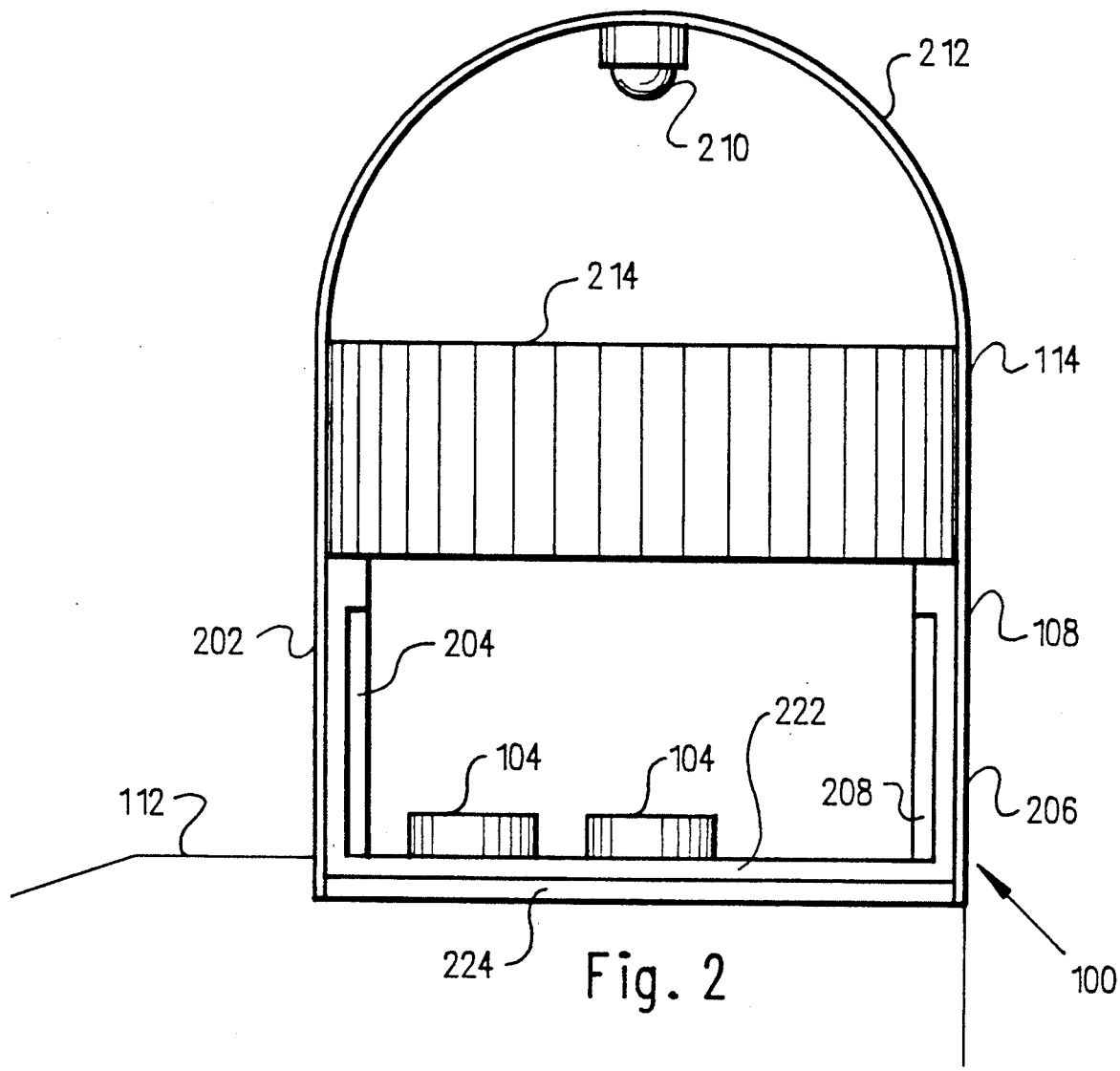
FIG. 2 is a side view in partial cross-section of the counting mechanism of one embodiment of the invention.

FIG. 2 shows a side view in partial cross-section of the counting compartment and illustrates the counting mechanism of one embodiment of the invention. After resting on the shelf 112, medication units 104 enter the counting compartment 108 through an opening 202 in the wall of the receptacle 102 which is controlled by a gate 204. After being counted, the medication units 104 exit to the exterior of the dispenser 100 through an opening 206 which is controlled by a gate 208. The gates 204, 208 are controlled by the knob 114 as indicated earlier.

The counting mechanism is comprised of a light source 210, for example, a light emitting diode (LED), located within and at the top of a dome 212, which allows the light to be located far enough away from the counting compartment 108 to ensure a reasonably even distribution of light on the medication units. Power for the light source is transmitted through curved arm 211 shown in FIG. 1. Light from the light source 210 passes through a transparent cover 214 of the knob 114 to impinge on medication units 104. Light not blocked by the medication units 104 continues through a filter 222 upon which the medication units 104 rest within the counting compartment to strike an incident light sensor 224. The amount of light measured by the incident light sensor 224 is subtracted from the total light which would be transmitted from the light source 210 to the incident light sensor 224 if the compartment 108 were empty and the difference is divided by the amount of light blocked by a single medication unit 104 to compute the total number of medication units 104 present in the counting compartment 108.

The dome 212 is fashioned of transparent material so that the patient can see into the counting compartment 108 in order to know when sufficient medication units 104 have been placed there. After placing the desired number of medication units 104, the patient then rotates the knob 114 to close the gate 204, which then starts the counting process. Because the dome 212 is transparent, ambient light will also enter the counting compartment, and this ambient light might confuse the incident light sensor 224 and interfere with the accuracy of the counting process. One way to avoid this problem is to fashion the dome 212 from a material which prevents the passage of light of a particular wavelength or color, for instance red light and to fashion the filter 222 underneath the counting compartment 108 from a material that allows red light to pass, but prevents all other wavelengths and colors from passing through. Thus the ambient light would be blocked from reaching the light sensor 224, but the light from the light source 210, which would be red light or include the red portion of the light spectrum, would pass through to the light sensor 224. Alternatively, the dome 212 could be made of material polarized in a first direction, and the filter 222 made of material polarized in a second direction at right angles to the first direction which would block ambient light but pass light from the light source 210.

Occasionally, a medication unit 104 might rest in the opening 202 between the receptacle 102 and the counting compartment 108 so that closure of the gate 204 would catch the medication unit 104 and crush the unit 104 if too much force were applied. Similarly the medication unit 104 might rest in the opening 206. To prevent this from happening, the knob 114 could be connected to the gates 204, 206 through a slip clutch (not shown) to prevent too much force from being applied. Additionally, the edges of the openings 202 and 206 and or the gates 204 and 208 could be made of a flexible material to reduce the likelihood of crushing.

Since counting is performed using light subtraction, there is a possibility that two medication units 104 could be superimposed on one another in the counting compartment 108, and thus could be counted as a single unit. To prevent this, a ceiling of transparent material of a selected thickness could be placed in the upper part of the counting compartment 108 to reduce the height of the compartment 108 to a height insufficient to allow two units 104 to be stacked. Alternatively, the height of the ceiling could be made adjustable by any one of a number of means readily known to those skilled in the art. However, unless the two units 104 were exactly superimposed, the incident light sensor and the logic could detect a partial superimposition without such additional ceiling and count the larger than usual shadow created by partial superimposition as two medication units 104.

Figure 3:
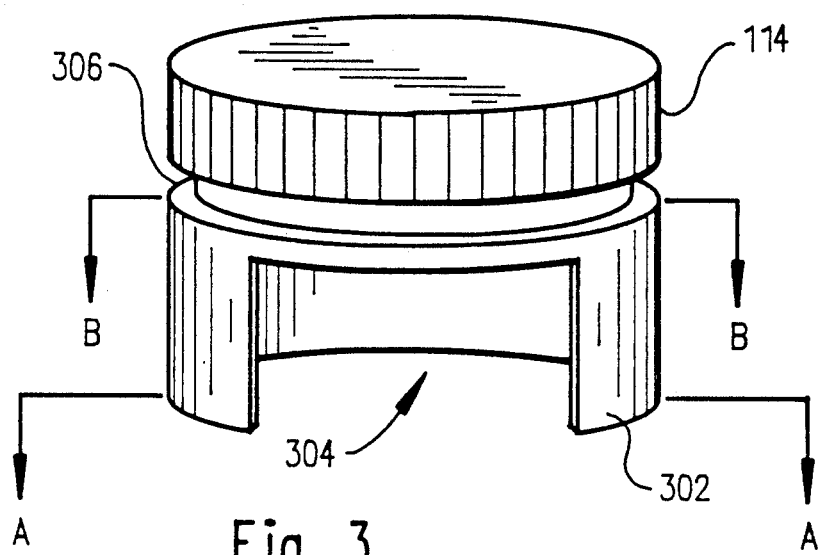
FIG. 3 is a perspective view of the gate mechanism within the counting compartment.

In the preferred embodiment of the present invention, the gates 204 and 208 are combined into a single gate mechanism. FIG. 3 shows a perspective view of this gate mechanism, and FIGS. 6A through 6F show cross sectional views of the gate mechanism in various positions during the dispensing operation. As shown in FIG. 3, the knob 114 is attached to a base cylinder 302 which has an opening 304 that cooperates with the openings 202 and 206, shown in FIG. 2. Below the knob 114 is a peripheral groove 306 which is formed to cooperate with a plunger and locking solenoid.

Figure 4:
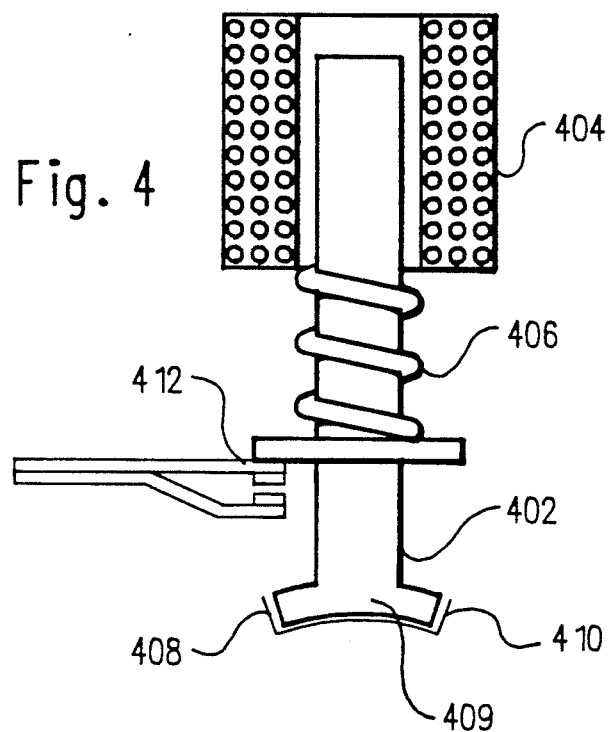
FIG. 4 is a partial cross-sectional view of the solenoid and plunger assembly used to control the gate mechanism.

FIG. 4 shows a solenoid and locking plunger assembly used to lock the gate mechanism during counting. One end of a plunger 402 extends into a solenoid 404 which is connected to the electronic logic (not shown in FIG. 4) of the dispenser. The plunger 402 is biased away from the solenoid by an extension spring 406. The base end 409 of the plunger 402 is designed to fit a slot in the groove 306, as will be described later. At the base of the plunger 402 is a first switch 408 and a second switch 41?. Movement of the upper end of the plunger 402 is adapted to trigger a third switch 412, as best shown in FIGS. 6B, D and F. The operation of these switches 408, 410, 412 will be described with reference to FIGS.

6A through 6F below and with respect to the flow chart shown in FIG. 7.

Figure 5:
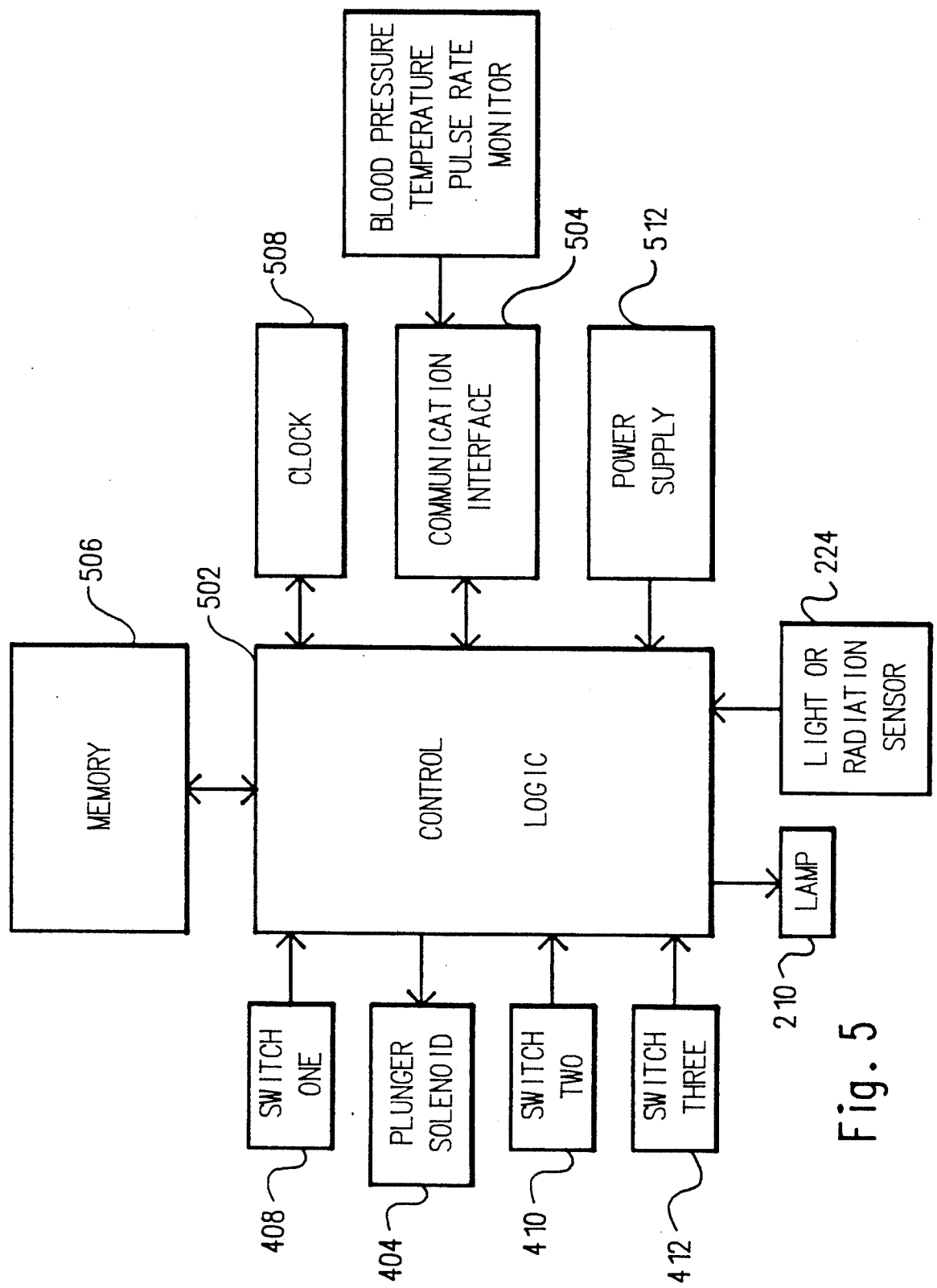
FIG. 5 is a block diagram of the electronic logic of the invention.

FIG. 5 is a block diagram of the electronic logic of the preferred embodiment of the invention. Control logic 50 contains the electronic sequencing necessary to correctly operate the dispenser. This logic may be implemented through discrete logic gates or may be implemented with a microprocessor. The logic 502 uses a communication interface 504 to receive information, such as for example dosage amount and time interval for dispensing, and to send information to another device regarding medication dispensed. This information is retained in a memory 506, along with any other data needed by the control logic 502. A clock 508 supplies time information to the control logic 502, which can also update the clock 508 upon instructions received from the communication interface 504. The control logic 502 also receives information from the three switches, 408, 410, and 412 and can activate the solenoid 404. The control logic 502 controls the lamp 210 and receives data from the light sensor 224. The control logic 502 and its associated, interconnected devices are powered by a power supply 512, which may be a battery.

The power supply 512 is constructed with a voltage regulator and low battery sensor to ensure that the lamp 210 always has a consistent voltage, so that the lamp 210 always supplies the same light intensity. The dispenser could be constructed without such a voltage regulator, however, by arranging for the counting compartment 108 to be illuminated when empty each time before medication units 104 are placed in the counting compartment 108 and using the quantity of light transmitted through the empty counting compartment 108 in the calculations required for counting.

An alternative way to eliminate the voltage regulator would be to include a second light sensor which could not be blocked by medication. This light sensor would serve as a reference to provide information that could be used to calculate the amount of light passing through an empty counting compartment 108.

Figure 6A:
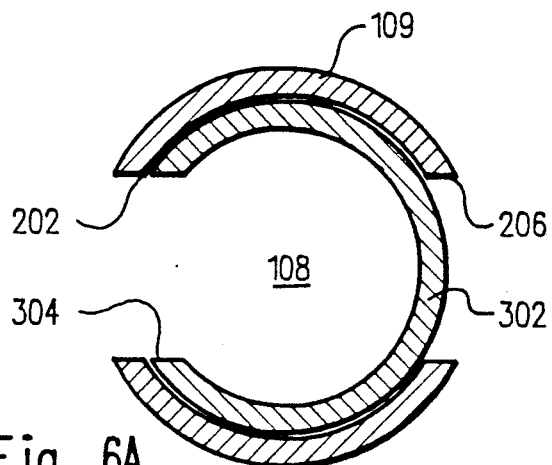
FIGS. 6A-6F shows several cross-sectional views of the gate illustrating the various locations of the gate during operation, with FIGS. 6A, 6C and 6E being taken along the line A—A in FIG. 3, and FIGS. 6B, 6D and 6F being taken along the line B—B in FIG. 3.
Figure 6B:
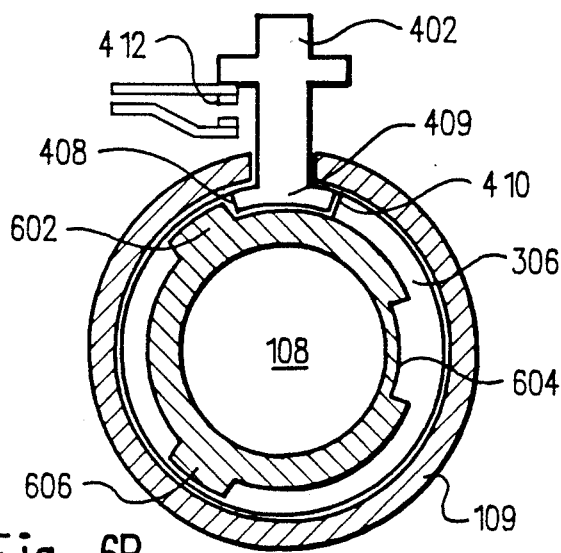
Figure 6C:
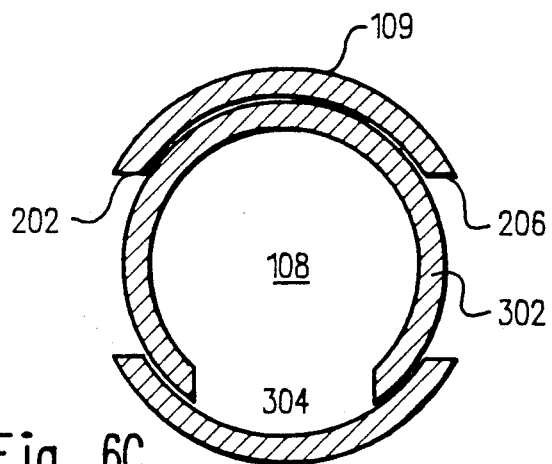
Figure 6D:
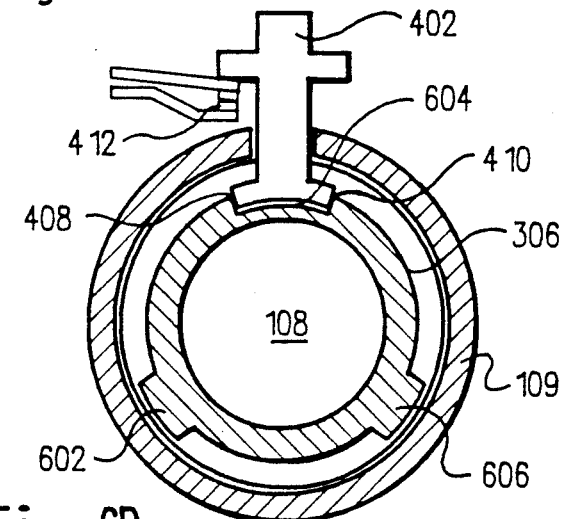
Figure 6E:
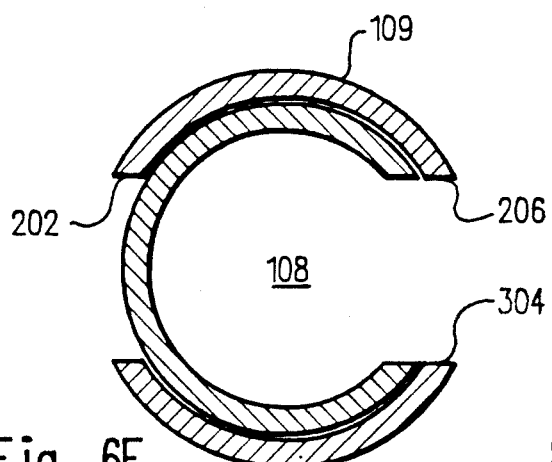
Figure 6F:
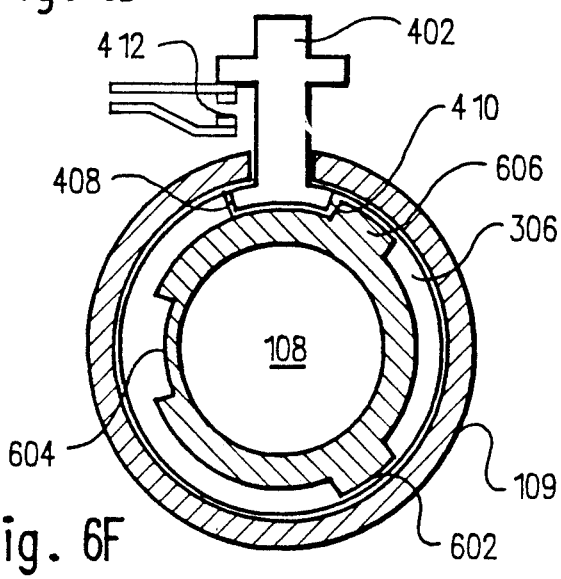

FIG. 6A through 6F show the function of the base cylinder 302 within the circular vertical wall 109 of the counting compartment 108, the plunger 402, the base end of the plunger 409, and the switches 408, 410 and 412 during the dispensing operation. FIGS. 6A, 6C, and 6E show a top view of a cross-section taken through line A—A of FIG. 3. FIGS. 6B, 6D, and 6F show a top view of a cross-section taken through line B—B of FIG. 3.

Referring now to FIGS. 1, 2, 3, 4, 5 and 6A through 6F, the operation of dispenser 100 is as follows. When a pharmacist or some other person places medication in the receptacle 102, the cover 104 is attached to the receptacle 102. The prescription information is forwarded by an external device, for example the pharmacist's computer, through the communication interface 504 and is stored in the memory 506. This information includes the amount of light blocked by a single medication unit 104 (which is usually proportional to the cross-sectional area of the medication unit 104), the amount of medication to be dispensed, the time it is to be dispensed, and any other conditions that must be met.

When the dispenser 100 is given to the patient, the memory will be set to a "permission to return" state which allows the patient to align the opening 304 on the base cylinder 302 with the opening 202 in the receptacle 102 in order to move medication units 104 into the counting compartment 108. The relative positions of the opening 202, and the base cylinder opening 304 are shown in FIG. 6A.

FIG. 6B shows the corresponding position of the various elements which are incorporated in the groove 306, namely a first stop 602, a slot 604, and a second stop 606. These stops 602 and 606 and the slot 604 are formed inside the groove 306. The first stop 602 presses against the plunger base end 409, and therefore causes the first switch 408 to close.

With the base cylinder 302 and the plunger 402 in the position of FIGS. 6A and 6B, the patient can shake the dispenser 100 to cause a desired number of medication units 104 to enter the counting compartment 108, while viewing the compartment 108 through the transparent dome 212. The patient then rotates the knob 114 counter clockwise (the stop 602 prevents the knob from rotation in the clockwise direction) to the position shown in FIGS. 6C and 6D. In this position, the plunger base end 409, because of pressure from the spring 406, drops into the slot 604, thereby locking the base cylinder 302 into a position wherein the counting compartment 108 is closed to all openings, and medication units 104 cannot be moved out of the counting compartment 108. Movement of the plunger base end 409 into the slot 604 causes closure of switch three 412. The patient then orients the dispenser 100 so that the counting compartment 108 is in a horizontal position with the light source 210 upper most for medication counting.

When switch three 412 is activated, the logic 502 turns on the light 210 to illuminate the counting compartment 108. The intensity of the light 210 is established before the dispenser 100 is given to the patient on the basis of the characteristics of the light source 210 and the current supplied to the light 210. The quantity of light passing through the counting compartment 108 is measured by the incident light sensor 224. Using this quantity, and the amount of light blocked by a single medication unit 104 stored in the memory 506, the logic 502 determines the number of medication units 104 in the counting compartment 108.

If the number of medication units 104 in the counting compartment 108 is desireable for the particular dispensing time, a "permission to remove condition" is triggered and stored in the memory 506. As the patient further rotates the knob 114 in a counter-clockwise direction, switch two 410 comes into contact with one edge of the slot 604 which closes the switch 410, and causes the solenoid 404 to be activated by the logic 502, which retracts the plunger 402 and allows the patient to further rotate the knob 114 in a counter clockwise direction to the position shown in FIGS. 6E and 6F, where switch two 410 is closed a second time. In this position, the opening 304 of the base cylinder 302 is aligned with the exterior opening 206 to allow the medication units to be dispensed to the patient. The determination that medication units 104 were in the counting compartment 108 at the time of the counting, plus the closure of switch two 410 on two occasions would establish a presumptive record of medication unit 104 removal.

After removing the medication units 104, the patient would be instructed to rotate the knob 114 in a clockwise direction until the rotation is stopped by the plunger 402 entering the slot 604 so that the various elements are aligned as shown in FIGS. 6C and 6D. Movement of the plunger 402 into the slot 604 would again close switch three 412, which would enable a second count. The recording of the first count followed by the closing of switch two 410 at least once, followed by a second count showing no medication units 104 in the counting compartment 108 would establish a definitive record of medication removal. The clock 508 could be used to establish the time of the medication removal.

If the second count determines that the counting compartment 108 is empty, a "permission to return" would be stored in the memory 506. If the patient desires to remove additional medication he further rotates the knob 114 in a clockwise direction, whereby switch one 408 would contact the edge of the slot 604 and close. This closure, along with the permission to return condition, causes the logic to activate the solenoid 404 to retract the plunger 402. This retraction allows the patient to continue a clockwise rotation until the first stop 602 contacts the base end 409 of the plunger 109, at which time the opening 304 would cooperate with the opening 202 as shown in FIGS. 6A and 6B, thus completing the dispensing cycle.

The closure of switch one 408 just prior to the removal of plunger base end 409 from the slot 604 could also be used to illuminate lamp 210 so as to determine the quantity of light transmitted through the empty counting compartment and provide information used in calculating the quantity of medication units 104 removed with the next dispensing cycle.

If, at the time of the first count, the logic 502 determines that the amount of medication in the counting compartment is not the prescribed amount, the logic 502 would not establish a "permission to remove", and the patient could not continue to rotate the knob 114 counter-clockwise. Instead the logic 502 would maintain the "permission to return" state which would allow the patient to rotate the knob 114 clockwise back to the position shown in FIGS. 6A and 6B. This would permit excess medication to be removed or additional medication units 104 to be added to the counting compartment.

The switches one and two 408, 410 may be spring biases either by forming the metal contacts of the switches as leaf springs or by biasing the contacts with a compression spring so that the switches are open when the patient releases the knob 114.

If, at the time of the second count, there is an object remaining in the counting compartment 108, the logic 502 would not create a definitive record of medication removal and would not establish a "permission to return" condition so the patient could not continue to rotate the knob 114 in a clockwise direction. Instead, the logic 502 would maintain a "permission to remove" condition so that the patient could rotate the knob 114 in a counter-clockwise direction back to the position shown in FIGS. 6E and 6F to allow for the removal of medication units 104 or whatever object was in the counting compartment.

When the dispenser 100 is given to the patient, the patient would be instructed about the necessity of removing the proper quantity of medication with each rotation of the knob 114, as well as information on how to correct the problem when the knob 114 will not rotate in a certain direction. Alternatively, the dispenser 100 could be constructed with a display, such as a liquid crystal display, to instruct the user on how to remove the medication and what to do at each step in the removal process. If present, this display would be activated by the logic 502.

Figure 7:
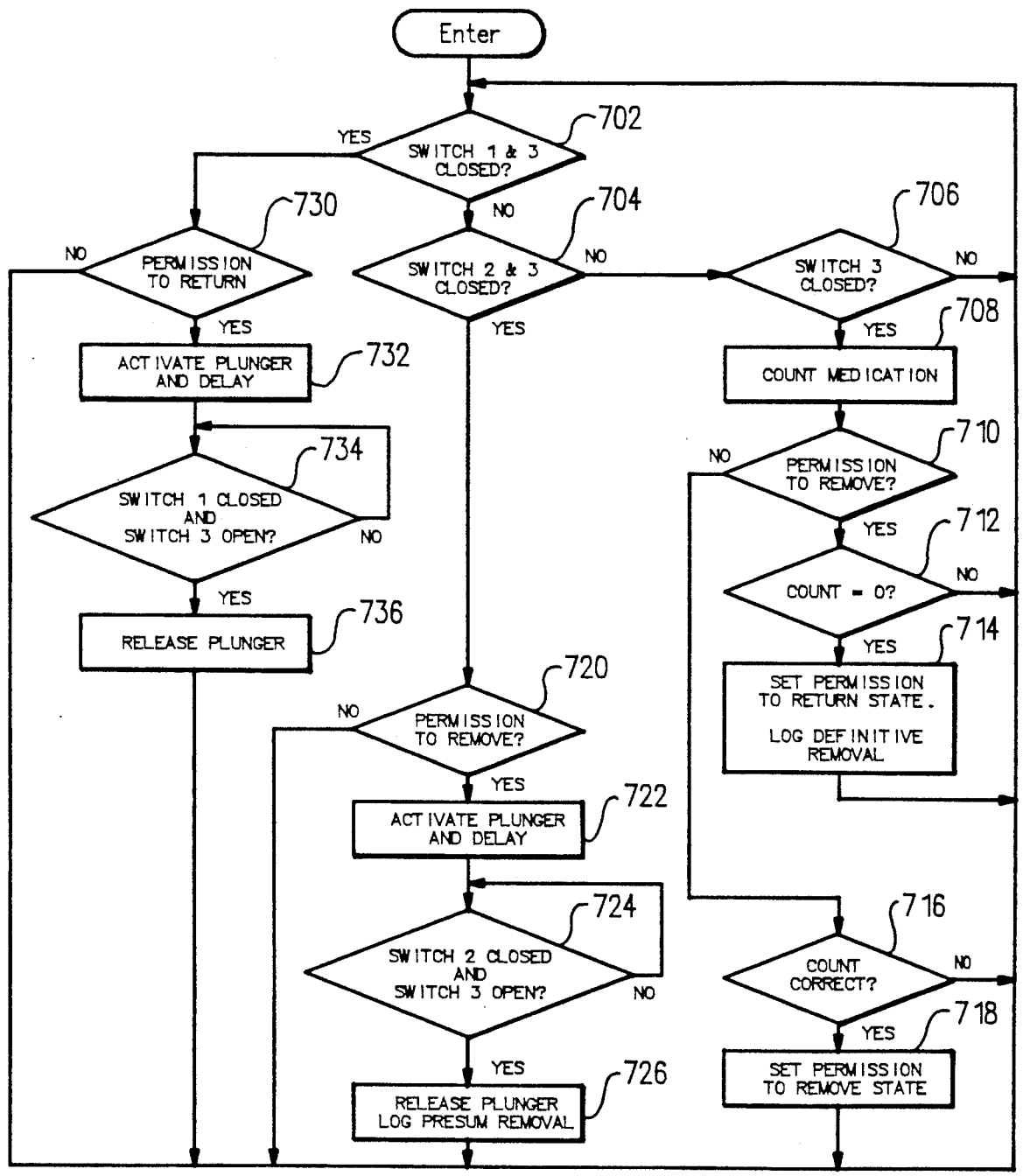
FIG. 7 is a flow chart of the method of operation of the invention.

FIG. 7 shows a flow chart of the operation of the dispenser during the dispensing cycle. As shown in FIG. 7, after entry, block 702 checks switch one 408 and switch three 412 to determine if both are closed. If either is open, block 702 transfers to block 704 to check switch two 410 and switch three 412. If either is open, control transfers to block 706 to check switch three 412 again. If switch three 412 is open, control returns to block 702 to complete the loop. All three switches will be open when the knob 114 is not located in one of the three positions defined by FIGS. 6A, 6C, and 6E. The electronic logic will continuously cycle through blocks 702, 704 and 706 testing the switches until the closing of one or more of the switches causes the logic to transfer to other blocks.

During the dispensing cycle, after moving medication units 104 from the receptacle 102 to the counting compartment 1? 8, the patient rotates the knob 114 counter-clockwise from the position shown in FIGS. 6A and 6B to the position shown in FIGS. 6C and 6D, which causes the plunger base end 409 to drop into the slot 604. At this time, switch three 412 closes to start the count, whereupon block 706 detects the closure of switch three 412 and transfers to block 708 to count the medication units 104 in the counting compartment 108. Since a permission to remove condition has not been set (i.e., the permission to return is still set), control transfers to block 716 to evaluate the medication units 104 count. If the count is correct, control goes to block 718 to set the permission to remove state, and control returns to block 702 to await the next action by the patient. If the counter is incorrect, the permission to remove state is not set, but control returns to block 702 to continue the loop.

The next action by the patient is to continue rotating the knob 114 counter clockwise, such that switch two 410 closes upon contacting the edge of the slot 604. When this closure happens, control transfers from block 704 to block 720 which checks for permission to remove. If permission to remove had been set, because the medication count was correct, control transfers to block 722 which activates the solenoid 404. This retracts the plunger 402 to allow the knob to continue rotation. Control then transfers to block 724 to wait for knob 114 to be completely rotated counter clockwise. When the knob 114 has been rotated to a full counter clockwise position, switch two 410 will again close, and control will transfer to block 726 to deactivate the solenoid 404, and to record that the medication was presumptively removed Control then returns to block 702 to await further action by the patient.

After removing the medication, the patient rotates the knob 114 clockwise to the count position shown in FIGS. 6C and 6D. When the plunger 402 enters the slot 604, switch three 412 closes, to start the count. This causes control to transfer to block 708 to again count the medication units 104 in the counting compartment 108. Control then transfers to block 710, and since the permission to remove state has been set, control transfers to block 712. If the count is not zero, all the medication units 104 were not removed, and the permission to remove state is not changed, so control transfers back to block 702 to await further action. If the count is zero, control transfers to block 714 where the permission to return state is set, and the memory 506 is set to show definitive removal of medication before control returns to block 702 to await further patient action.

As the patient continues to rotate the knob 114 clockwise, switch one 408 is closed, causing control to transfer to block 730. Since the permission to return state was set by block 714 earlier, control goes to block 732 to activate the solenoid 404 to allow the continued clockwise rotation. Control goes to block 734 which waits until the knob 114 has been fully rotated clockwise, and switch one 408 is closed again, before transferring to block 736 to deactivate the solenoid 404. After the solenoid 404 is deactivated, control returns to block 702 to continue the loop.

Other conditions, such as pulse rate, blood pressure, or temperature could be entered into the memory when the medication is prescribed, and compared to a second set of similar data entered through the communication interface 504 at the time of dispensing, as shown in FIG. 5. If the two sets of data matched, or fell within a prescribed range, the medication would be dispensed.

Another alternative would be to program the logic 502 to allow the user to remove as much medication as he wishes and simply record how much medication was removed, and the time of removal, with each dispensing sequence. When used in this manner, the logic would permit the base cylinder 302 to move from the position shown in FIGS. 6C and 6D to the position shown in 6E and 6F without restriction. On the other hand, the logic would prevent the cylinder 302 from moving between the position shown in FIGS. 6C and 6D to the position shown in FIG. 6A and 6B when one or more objects were detected in the counting compartment.

Figure 8:
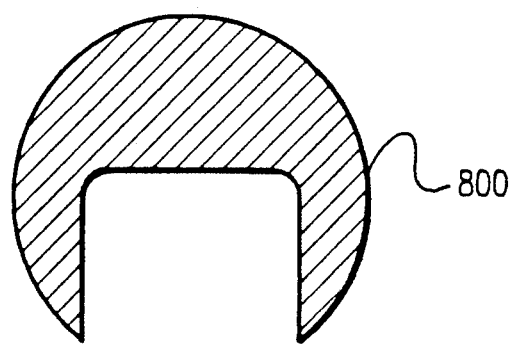
FIG. 8 is a cross-sectional view of an insert used to reduce the amount of medication that ca be contained in the counting compartment at one time.

When small medication units 104 were being dispensed in small quantities, an additional insert or plug 800, shown in FIG. 8, could be used to reduce the number of medication units 104 that could be placed in the counting compartment at one time. This would make the dispenser easier to use with small medication units 104. If desired, the opening in the plug 800 could be the size of the medication unit 104 being dispensed so as to accommodate only a single medication unit 104 at any time. If this was done, the light sensor could be used solely to detect the presence of the medication unit 104 in the opening in the plug 800 when the base cylinder 302 was in the position shown in FIGS. 6C and 6D. The use of the plug 800 would make it possible to record and or control the dispensing of one medication unit 104 with each operation of the dispenser 100 with a similar sequence of steps as when the dispenser 100 is used to record the removal of multiple medication units 104 with each operation.

The patient might place the dispenser 100 upside down at the time when counting would take place causing an inaccurate count because the shadows of the medication units 104 could be larger than when the dispenser 100 is correctly positioned if the space between the top and bottom of the counting compartment was larger than the width of a medication unit. To prevent this occurrence, an additional sensor, such as a mercury switch, could be used to detect the position of the dispenser 100, and to prevent the counting if the dispenser 100 were not in the correct position. Alternatively, a slab of material of selected thickness could be placed in the upper portion of the counting compartment to reduce the possibility of such an occurrence.

Figure 9:
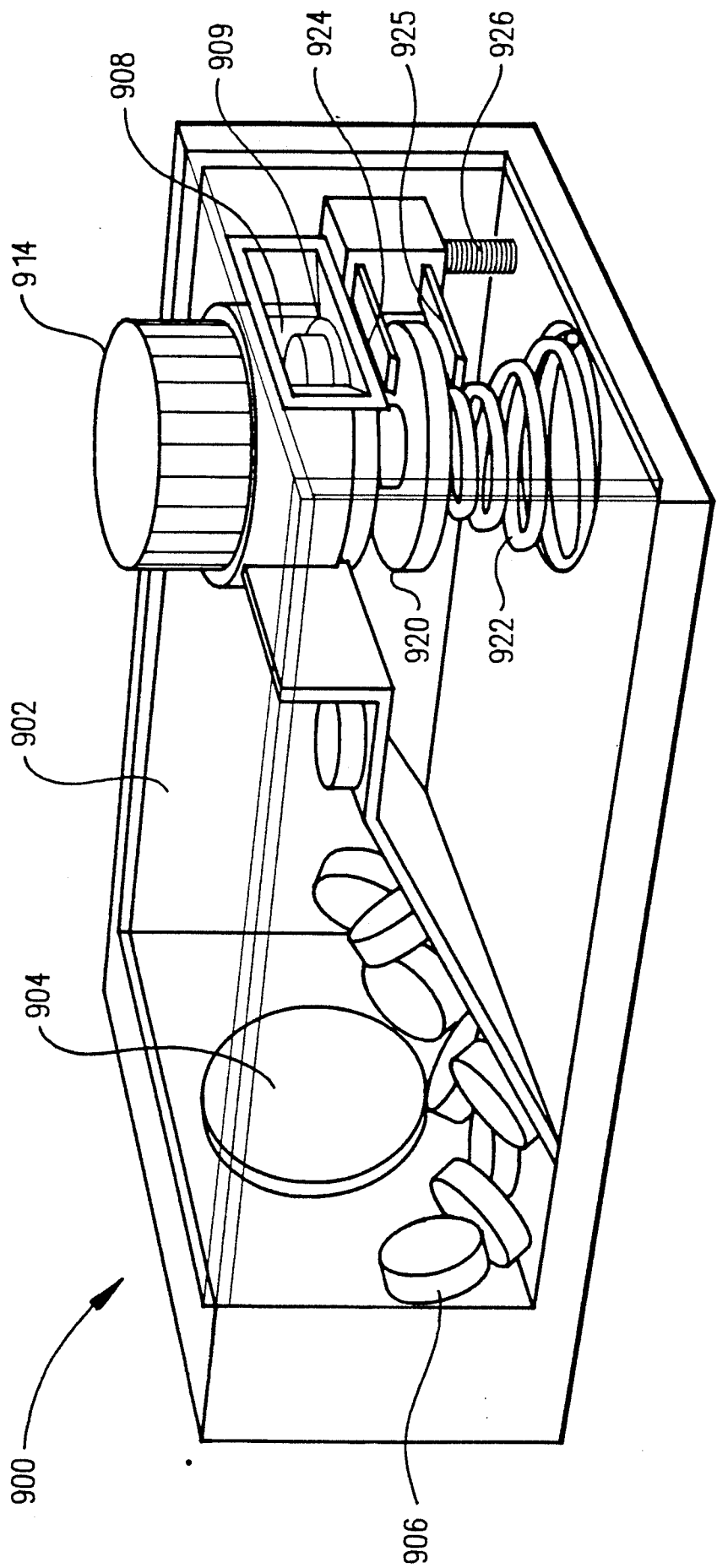
FIG. 9 is a perspective, phantom view of a medication dispenser in accordance with an alternative embodiment of the invention wherein the medication units are weighed to determine the number of such units in the counting compartment.

FIG. 9 shows an alternative embodiment of the invention wherein the counting mechanism comprises a scale to weigh the medication units 104. Such a scale is limited to determining if the weight in the counting compartment 108 is too little, too much, or just right. Therefore, this embodiment can only be used to dispense a fixed number of medication units after any single weighing of the compartment contents. Despite this limitation, this is a useful embodiment of the invention since it uses an inexpensive scale.

Referring now to FIG. 9, a second embodiment of the dispenser 900 is shown. A receptacle 902 has an opening 904 to allow a pharmacist to fill the receptacle 902 with a quantity of medication units 906. The medication units 906 are moved to a counting compartment 908 by the patient shaking or otherwise maneuvering the dispenser 900. The patient then turns the knob 914 counter clockwise (as seen from the top of the dispenser) to a counting position. The floor 909 of the counting compartment 908 moves downward in response to the weight of the medication units 906 causing a disk 920, attached to the floor 909 of the counting compartment 908 to also move downward. This downward movement is opposed by a compression spring 922. Thus the disk 920 and the spring 922 form a scale. The disk 920 is located between two contact plates 924 and 925 If there is no object on the floor 909 of the counting compartment 908, the disk 920 is forced by the spring 922 to touch or maintain contact with contact plate 924. The position of the plates 924 and 925 are adjusted so that when the desired number of medication units 906 are on the floor 909 of the counting compartment 908, the disk 920 will lie between the contact plates 924 and 925, which would indicate that the proper number of medication units 906 are in the counting compartment 908. After removal of the medication, the floor 909 of the compartment 908 and the disk 920 move upward to allow the disk 920 to touch the upper contact plate 924 and indicate that the compartment 908 is empty. The number of medication units 906 allowed in the compartment 908 before removal of medication can occur is set by moving the contact plates 924 and 925 up or down by means of a screw 926.

The operation of this embodiment is similar to the embodiment of FIG. 1, except that the counting is performed with the scale comprised of the disk 920, the contact plates 924 and 925, a spring 922, and the adjustment screw 926.

The determination by the logic that the proper amount of medication was in the counting compartment 908 would not be made until a period of time, for example, 3 seconds, had passed when no contact was made between the disk 920 and either contact plate 924 or 925 as determined by the clock 508. This restriction is necessary since there is always a short period of time when the disk 920 is not in contact with either plate as it moves between the contact plates in response to the motion of the dispenser 100 or in response to adding or removing medication units 906 into or from the counting compartment 908.

A more conventional weighing means such as a magnetic force restoration scale which determines the weight of the material in the counting compartment 908 could also be used. Using this type of scale, the memory 506 could be provided with the weight of a single medication unit 906 and the logic 502 could calculate the number of medication units 906 in the counting compartment 908 from the weight of the total medication units 906 in the counting compartment 908 and the known weight of a single medication unit 906. With this type of scale, it is possible to program the logic so that the dispenser 900 can be used to determine the number of medication units 906 being removed each time medication is counted in the counting compartment 908 without requiring that a predesignated number of medication units 906 are removed with each operation of the dispenser. It is also possible to program such logic so that it is necessary that a predesignated number of medication units 906 be removed with each use of the dispenser 900.

Another embodiment of the present invention uses a machine vision system based on the principle of a television camera to count the medication units in the counting compartment. Still another alternative is to place a minuscule amount of radioactivity in each medication unit, and measure the amount of radioactivity emitted from the counting compartment to determine the number of medication units therein. In this embodiment, the light sensor 224 shown in FIG. 2 will be replaced by a conventional radiation detector, and the light 210 and filter 222 may be omitted.

A further embodiment of the present invention contemplates a separate dispensing mechanism provided with the counting compartment, which mechanism may be selectively attached and disattached from each one of a plurality of receptacles containing medication or other objects. Each receptacle would possess a door or gate through which the medication could be removed from the receptacle. The gate would be closed normally and could be opened only when the dispensing mechanism was attached to the receptacle. The receptacle would be provided with an electronic memory such as a non-volatile RAM for storing the identification, light shadowing characteristics, weight, radioactivity, etc. of the medication contained in the receptacle. The dispensing mechanism would be provided with electronic logic for counting the medication. The dispensing mechanism could also be provided with electronic memory for storing the various times, patient status and other conditions for dispensing medication, and determining if all conditions were correct before dispensing the medication. In operation, the dispensing mechanism would be selectively attached to the receptacle thereby opening the gate and thereby connecting the electronic components of the receptacle and the dispensing mechanism. The combined device would then be operated to dispense medication in the same manner as described with respect to the dispenser shown in FIGS. 1-9. The dispensing mechanism could not be detached from the receptacle unless any medication within the counting compartment had been removed. The number of medication units dispensed and the time of dispensing would be recorded in the electronic memory.

While this disclosure describes using this type of dispenser for medication units, those skilled in the art will recognize that a dispenser based on these principles could be used to dispense, count and control the removal of any object with at least one measurable uniform characteristic, such as nuts, washers, and bolts.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A process of dispensing a plurality of units of medication, said units being contained within the hollow interior of a receptacle having a compartment disposed between and in communication within the hollow receptacle interior and the receptacle exterior and having means for counting the number of medication units in said compartment, said process comprising the steps of:
   maneuvering at least one medication unit from said hollow receptacle interior into said compartment;
   preventing said at least one medication unit from passing from said compartment to the receptacle exterior as said at least one medication unit is being maneuvered from said hollow receptacle interior into said compartment;
   counting the number of medication units in said compartment with said counting means;
   preventing said at least one medication unit from passing between said compartment and the receptacle exterior as the number of medication units in said compartment is counted by said counting means;
   permitting said at least one medication unit to pass from said compartment to the receptacle exterior after the number of medication units in said compartment has been counted by said counting means; and
   preventing medication units from passing between the hollow receptacle interior and said compartment whenever said at least one medication unit is permitted to pass from said compartment to the receptacle exterior.

2. A process of dispensing a plurality of units of medication according to claim 1 wherein said at least one medication unit is permitted to pass from said compartment to the receptacle exterior only if the number of medication units in said compartment counted by said counting means is less than a predetermined number.

3. A process of dispensing a plurality of units of medication according to claim 1 wherein said at least one medication unit is permitted to pass from said compartment to the receptacle exterior only if the number of medication units in said compartment counted by said counting means is the same as a predetermined number.

4. A process of dispensing a plurality of units of medication according to claim 1 wherein the number of medication units is counted by weighing the total medication units in said compartment.

5. A process of dispensing a plurality of units of medication according to claim 1 wherein the number of medication units is counted by determining the weight of a single medication unit and then by weighing the total medication units in said compartment.

6. A process of dispensing a plurality of units of medication according to claim 1 wherein said step of counting the number of medication units includes the steps of shining light onto the medication units in said compartment and measuring the quantity of light.

7. A process of dispensing a plurality of units of medication according to claim 1 wherein the number of medication units is counted by transmitting light through said compartment and measuring the quantity of light transmitted when no medication units are in said compartment and then transmitting light through said compartment and measuring the quantity of light transmitted when said at least one medication unit is in said compartment.

8. A process of dispensing a plurality of units of medication according to claim 1 wherein the number of medication units is counted by transmitting light through said compartment and measuring the quantity of light transmitted when no medication units are in said compartment, transmitting light through said compartment and measuring the quantity of light transmitted when a single medication unit is in said compartment, and transmitting light through said compartment and measuring the quantity of light transmitted when said at least one medication unit is present in said compartment.

9. A process of dispensing a plurality of units of medication according to claim 1 wherein the number of medication units is counted by measuring the radioactivity of said at least one medication unit.

10. A process of dispensing a plurality of units of medication according to claim 1 comprising the further step of electronically recording the time substantially when said at least one medication unit passes from said compartment to the receptacle exterior.

11. A process of dispensing a plurality of units of medication according to claim 10 comprising the further step of electronically recording the number of said at least one medication units passing from said compartment to the receptacle exterior.

12. A process of dispensing a plurality of units of medication according to claim 1 comprising the further step of preventing medication units from passing from said compartment to the receptacle exterior if a person's characteristics selected from the group consisting of pulse rate, blood pressure, and temperature are outside a predetermined range.

13. A process of dispensing a plurality of units of medication according to claim 1 comprising the further step of preventing medication units from passing from said compartment to the receptacle exterior if certain dispensing characteristics selected from the group consisting of the number of medication units dispensed within a previous time period are outside a predetermined range of numbers.

14. A process of dispensing a plurality of units of medication according to claim 1 comprising the further step of signalling an alarm whenever the number of medication units dispensed within a previous time period is less than a predetermined number.

15. A process of dispensing a plurality of units of medication according to claim 1 wherein said at least one medication unit is prevented from passing between said compartment and either the hollow receptacle interior or the receptacle exterior as the number of medication units in said compartment is counted by said counting means.

16. A process of dispensing a plurality of objects, said objects being contained within the hollow interior of a receptacle having a compartment disposed between and in communication with the hollow receptacle interior and the receptacle exterior and having means for counting the number of objects in said compartment, said process comprising the steps of:
maneuvering at least one object from said hollow receptacle interior into said compartment;
preventing said at least one object from passing from said compartment to the receptacle exterior as said at least one object is being maneuvered from said hollow receptacle interior into said compartment;
counting the number of objects in said compartment with said counting means;
preventing said at least one object from passing between said compartment and the receptacle exterior as the number of objects in said compartment is counted by said counting means;
permitting said at least one object to pass from said compartment to the receptacle exterior after the number of objects in said compartment has been counted by said counting means; and
preventing objects from passing between the hollow receptacle interior and said compartment whenever said at least one object is permitted to pass from said compartment to the receptacle exterior.

17. A process of dispensing a plurality of objects according to claim 16 wherein said at least one object is prevented from passing between said compartment and either the hollow receptacle interior or the receptacle exterior as the number of objects in said compartment is counted by said counting means.

18. A medication dispenser for counting medication units dispensed comprising:
a receptacle having a substantially hollow interior for storing a plurality of medication units to be dispensed;
a counting compartment having a substantially hollow interior for holding medication units during counting;
an internal opening between said receptacle and said counting compartment;
an external opening between said counting compartment and an exterior of the dispenser through which medication units are dispensed;
means for selectively communicating said internal opening with said hollow interior of said receptacle to allow passage of medication units into said counting compartment and for selectively communicating said external opening with the exterior of the dispenser to allow dispensing of medication units; and
counting means for counting medication units during passage through said counting compartment, said counting means including means for determining the magnitude of a uniform characteristic of medication units in said counting compartment and comparing the magnitude of said uniform characteristic with the magnitude of said uniform characteristic of a single medication unit.

19. The dispenser of claim 18, further comprising means for selectively varying the effective size of said counting compartment.

20. The dispenser of claim 18, further comprising means for selectively restricting the size of said counting compartment to accommodate no more than one medication unit.

21. The dispenser of claim 18, wherein said receptacle is of a dimension that allows medication units to be loosely arranged therein.

22. The dispenser of claim 18, wherein said counting compartment is of a dimension that allows a plurality of medication units to be loosely arranged therein.

23. The dispenser of claim 18, wherein said counting compartment comprises one or more transparent surfaces whereby medication units can be viewed during counting.

24. The dispenser of claim 18, further comprising confining means for confining medication units within said counting compartment during counting.

25. The dispenser of claim 24, wherein said confining means comprises:
means for selectively blocking and unblocking said internal opening; and
means for selectively blocking and unblocking said external opening.

26. The dispenser of claim 25, wherein said confining means includes preventing means for selectively preventing simultaneous unblocking of said internal opening and said external opening.

27. The dispenser of claim 26, further comprising position sensing means for sensing the position of said dispenser and wherein said preventing means prevents unblocking of said internal opening and said external opening in a predetermined position.

28. The dispenser of claim 25, further comprising electronic logic means for controlling said blocking and unblocking.

29. The dispenser of claim 28, wherein said electronic logic means further comprises:
 receiving and storing means for receiving and storing dispensing criteria comprising:
  an amount of medication units previously dispensed:
  a time when a last dispensing occurred;
  a time interval for regularly dispensing medication units; and
  an amount of medication units to be dispensed at each interval; and
 means operatively connected to and responsive to said receiving and storing means for unblocking said external opening when the number of medication units to be dispensed is no greater than the number to be dispensed within a time interval.

30. The dispenser of claim 29, wherein said dispensing criteria further comprises other criteria, such as a patient's pulse rate, blood pressure, and temperature.

31. The dispenser of claim 29, further comprising:
 audible indicating means for audibly indicating when medication units should be dispensed; and
 means operationally connected to and responsive to said receiving and storing means for activating said audible indicating means when medication units are to be dispensed.

32. The dispenser of claim 29, further comprising:
 display means for indicating a quantity of and time for medication dispensing; and
 display means operationally connected to and responsive to said receiving and storing means for displaying the amount of medication units to be dispensed and when the medication units are to be dispensed.

33. The dispenser of claim 28, wherein said electronic logic means further comprises means for communicating with an external device.

34. The dispenser of claim 33, further comprising memory means for retaining the count obtained by said counting means and the time when said counting means performs the counting.

35. The dispenser of claim 18, wherein said uniform characteristic is weight.

36. The dispenser of claim 18, wherein said counting means includes means for shining light onto medication units in said counting compartment and means for measuring said light to detect the degree of shadowing created by the medication units, said uniform characteristic comprising said degree of shadowing.

37. The dispenser of claim 18, wherein said means for determining comprises:
 light transmitting means for transmitting light through said counting compartment; and
 measuring means for measuring the degree of transmission of light through said counting compartment.

38. The dispenser of claim 37, wherein said light transmitting means further comprises light determining means for determining the amount of light transmitted to said measuring means when no medication units are within said counting compartment.

39. The dispenser of claim 18, wherein said uniform characteristic is radioactivity.

40. The dispenser of claim 18, further comprising clock means for determining when said counting compartment performs the counting.

41. A dispenser for counting objects dispensed comprising:
 a receptacle having a substantially hollow interior for storing a plurality of objects to be dispensed;
 a counting compartment having a substantially hollow interior for holding objects during counting;
 an internal opening between said receptacle and said counting compartment;
 an eternal opening between said counting compartment and an exterior of the dispenser through which objects are dispensed;
 means for selectively communicating said internal opening with said hollow interior of said receptacle to allow passage of objects into said counting compartment and for selectively communicating said external opening with the exterior of the dispenser to allow dispensing of objects; and
 counting means for counting objects during passage through said counting compartment, said counting means including means for determining the magnitude of a uniform characteristic of objects in said counting compartment and comparing the magnitude of said uniform characteristic with the magnitude of said uniform characteristic of a single object.

42. The dispenser of claim 41, wherein said counting means includes means for shining light onto objects in said counting compartment and means for measuring said light to detect the degree of shadowing created by the objects, said uniform characteristic comprising said degree of shadowing.

43. The dispenser of claim 41, further comprising confining means for selectively confining objects during passage through said counting compartment whereby said objects are prevented from leaving said counting compartment.

44. The dispenser of claim 43, wherein said confining means includes means for selectively blocking and unblocking said internal opening and said external opening.

45. The dispenser of claim 41, wherein said uniform characteristic is the weight of the objects.

46. The dispenser of claim 41, wherein said uniform characteristic is the radioactivity of the objects.

* * * * *